(12) United States Patent
Huang et al.

(10) Patent No.: US 9,145,227 B2
(45) Date of Patent: Sep. 29, 2015

(54) SUPPORT AND PACKAGING BOX FOR ELECTRONIC DEVICE

(71) Applicant: FIH (Hong Kong) Limited, Kowloon (HK)

(72) Inventors: Chiu-Chu Huang, New Taipei (TW); Yung-Wei Shen, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 14/153,767

(22) Filed: Jan. 13, 2014

(65) Prior Publication Data

US 2015/0008147 A1    Jan. 8, 2015

(30) Foreign Application Priority Data

Jul. 4, 2013   (TW) .................................. 102123967

(51) Int. Cl.
| | | |
|---|---|---|
| *B65D 5/52* | (2006.01) | |
| *B65D 81/02* | (2006.01) | |
| *F16M 11/00* | (2006.01) | |
| *G06F 1/00* | (2006.01) | |

(52) U.S. Cl.
CPC ............ *B65D 5/5206* (2013.01); *B65D 81/025* (2013.01); *F16M 11/00* (2013.01); *G06F 1/00* (2013.01)

(58) Field of Classification Search
CPC .... B65D 5/5206; B65D 5/5213; B65D 81/07; B65D 81/025; B65D 5/5007; B65D 5/5009; B65D 5/5021; B65D 5/5286; B65D 73/0042; B65D 81/053–81/058; A45C 11/10; A45C 11/16; F16M 11/00; G06F 1/00

USPC .......... 206/45.2, 45.24–45.27, 732, 735, 736, 206/45.28–45.3, 731, 486, 521, 583, 588, 206/592

See application file for complete search history.

(56) References Cited

U.S. PATENT DOCUMENTS

| | | | | | |
|---|---|---|---|---|---|
| 1,517,537 | A | * | 12/1924 | Daggett ......................... | 206/735 |
| 1,563,687 | A | * | 12/1925 | Chaney ...................... | 206/45.26 |
| 1,759,203 | A | * | 5/1930 | Neumann ...................... | 206/732 |
| 1,953,134 | A | * | 4/1934 | Srofe .......................... | 206/45.29 |
| 2,515,887 | A | * | 7/1950 | Moore ........................ | 206/45.26 |
| 3,339,714 | A | * | 9/1967 | Thompson .................... | 206/735 |
| 3,347,445 | A | * | 10/1967 | Wood ........................... | 206/45.3 |
| 4,718,545 | A | * | 1/1988 | Chrzanowski et al. ..... | 206/45.24 |
| 6,302,274 | B1 | * | 10/2001 | Ridgeway ..................... | 206/583 |
| 6,997,323 | B2 | * | 2/2006 | Maresh et al. ................ | 206/592 |
| 7,549,537 | B2 | * | 6/2009 | Hsu ............................... | 206/486 |
| 8,627,958 | B2 | * | 1/2014 | McDonald et al. ........... | 206/583 |

FOREIGN PATENT DOCUMENTS

| | | | | |
|---|---|---|---|---|
| GB | 231343 | A | * | 4/1925 |
| GB | 459481 | A | * | 1/1937 |

* cited by examiner

*Primary Examiner* — Bryon Gehman
(74) *Attorney, Agent, or Firm* — Novak Druce Connolly Bove + Quigg LLP

(57) ABSTRACT

A packaging box includes a box and a support received in the box. The support includes a top board, a bottom board opposite to the top board, and a side board interconnecting the top board and the bottom board. The top board defines a hole and forms four limiting boards connecting to the top board and resisting against the bottom board. The limiting boards and the bottom board cooperatively form a receiving chamber. The receiving chamber comprises a standing leg formed from the bottom board. The standing leg is capable of folding relative to the bottom board and cooperatively supporting the support to position on a plane with the side board.

9 Claims, 5 Drawing Sheets

SUPPORT AND PACKAGING BOX FOR ELECTRONIC DEVICE

BACKGROUND

1. Technical Field

The disclosure generally relates to packaging boxes, and particularly to a packaging box including a support for electronic devices.

2. Description of Related Art

To prevent fragile precise electronic devices such as mobile phones from being damaged during transportation (e.g. by water, dust and impact), the electronic devices are commonly put in packaging boxes before shipment. However, most the packaging boxes are discarded after users buy the electronic devices and take the electronic devices out from the packaging boxes, which is a waste of resources.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the disclosure.

DETAILED DESCRIPTION

Figure 1:
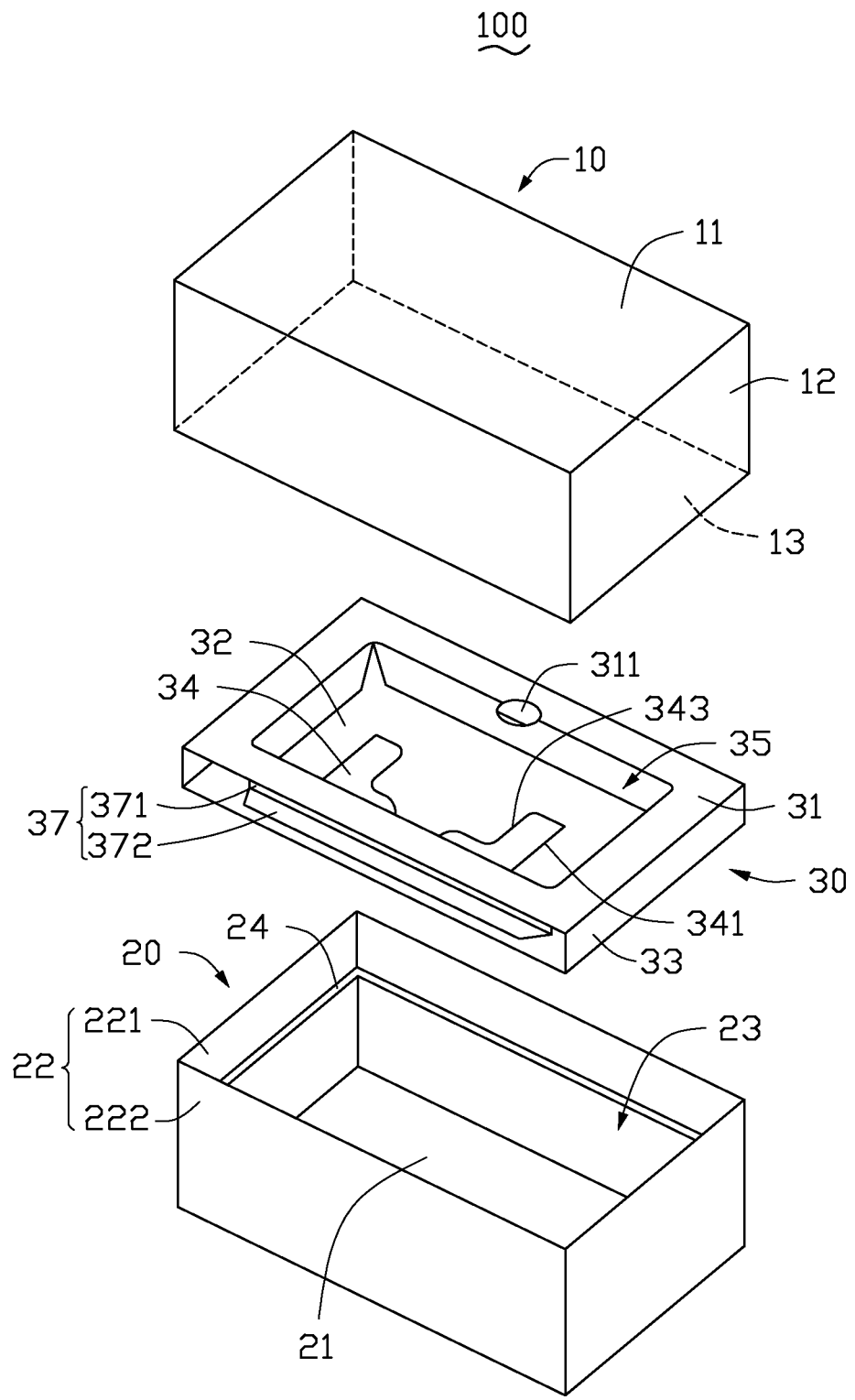
FIG. 1 is a disassembled view of a packaging box including a support, according to an exemplary embodiment of the disclosure.
Figure 5:
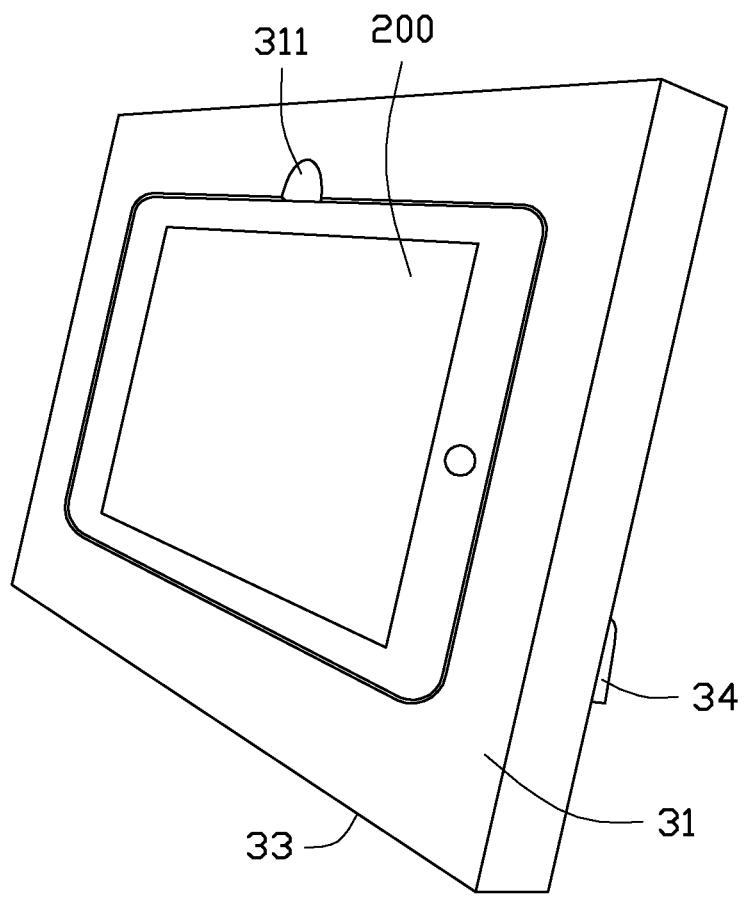
FIG. 5 is similar to FIG. 4, but shown from another aspect.

FIG. 1 is a disassembled view of a packaging box 100, according to an exemplary embodiment of the disclosure. The packaging box 100 is used to package an electronic device 200 (shown in FIG. 5). The packaging box 100 includes a first case 10, a second case 20, and a support 30. The support 30 is configured to accommodate the electronic device 200 when a user stores the electronic device 200 during everyday use. In addition, support 30 can be used to support the electronic device 200 to provide a better view angle when the electronic device 200 is used to, e.g., watch videos (as shown in FIG. 5). The first case 10 is covered outside the second case 20 so that the electronic device 200 is packaged in the packaging box 100.

Figure 2:
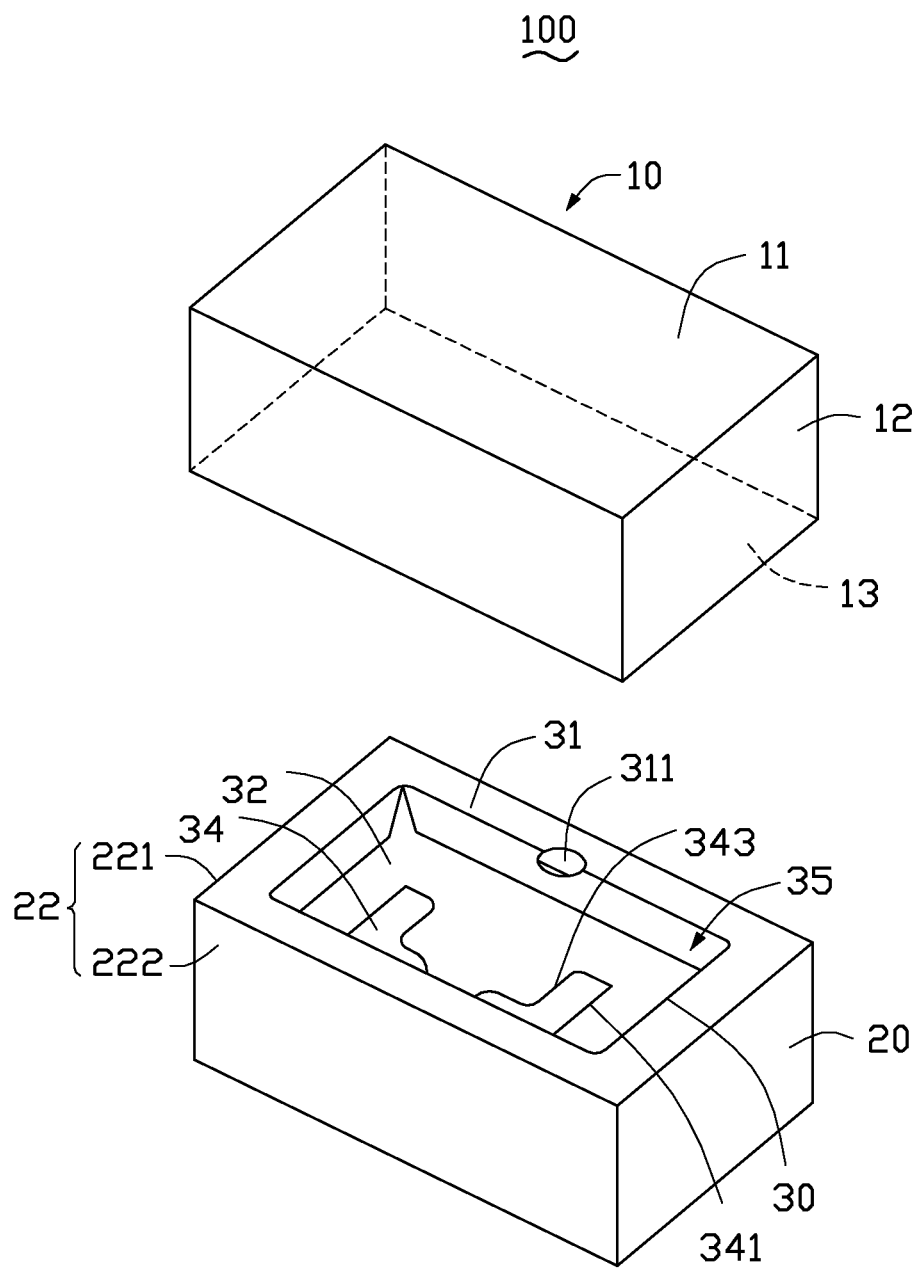
FIG. 2 is a partially assembled view of the package box of FIG. 1.

FIG. 2 shows that, the first case 10 includes a top wall 11 and a first side wall 12. The first case 10 and the second case 20 may be made of paper or plastic. The top wall 11 is substantially rectangular. The first side wall 12 protrudes from a peripheral edge of the top wall 11 and forms a first opening 13 at an end of the first case 10 facing the top wall 11.

The second case 20 includes a bottom wall 21 and a second side wall 22. The bottom wall 21 is substantially rectangular. The second side wall 22 protrudes from a peripheral edge of the bottom wall 21 and forms a second opening 23 at an end of the second case 10 facing the bottom wall 21. The second side wall 22 includes an inner surface 221 and an outer surface 222. A protrusion 24 protrudes from the inner surface 221 for supporting the electronic device 200 accommodated in the second case 20.

Figure 3:
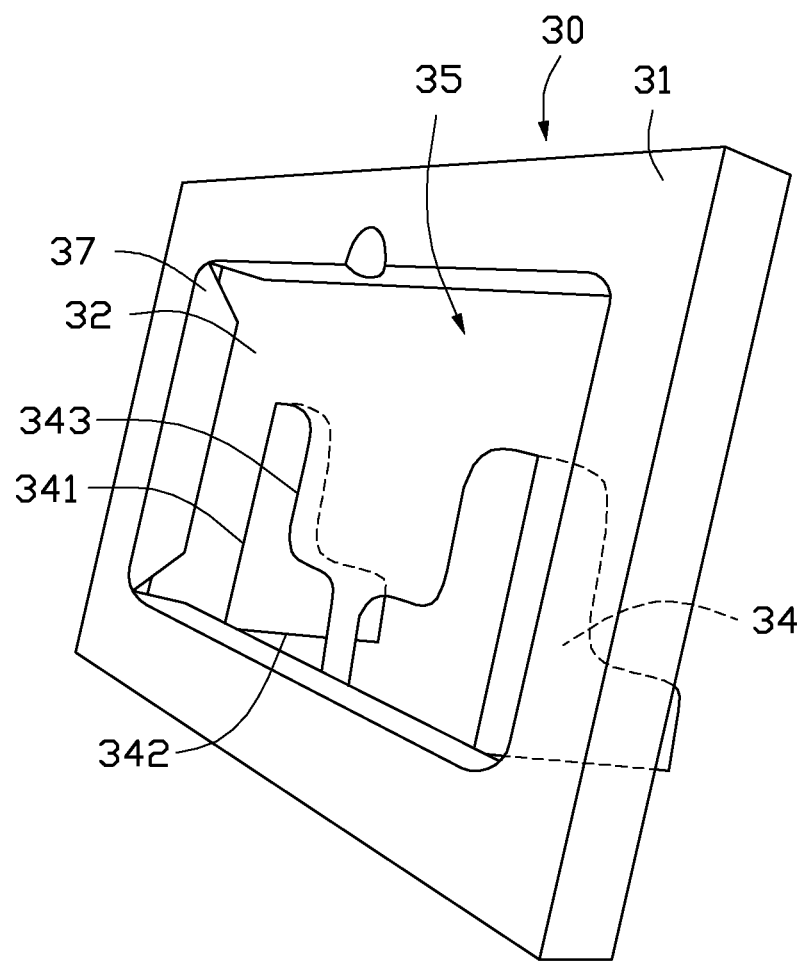
FIG. 3 is a schematic view of the support of the packaging box of FIG. 1.
Figure 4:
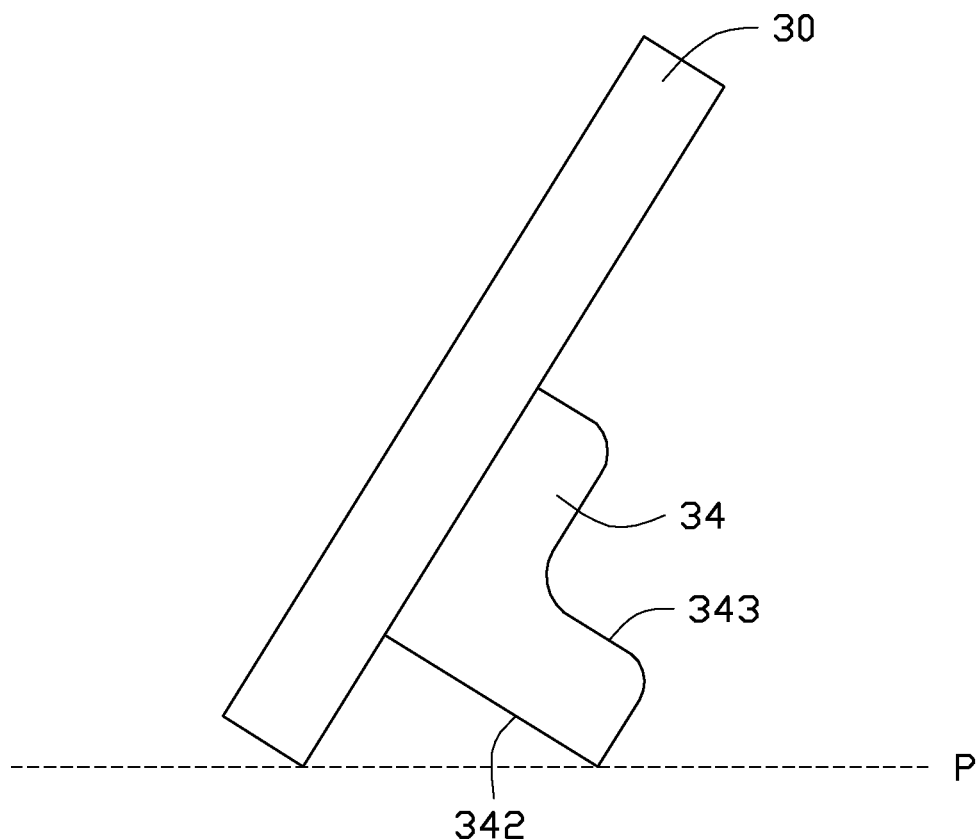
FIG. 4 is a side, schematic view of the support of FIG. 3 with an electronic device received in the support.

FIGS. 3 and 4 show that, the support 30 is substantially a hollow cuboid including a top board 31, a bottom board 32 opposite to the top board 31, and three side boards 33 interconnecting the top board 31 and the bottom board 32. A substantially rectangular hole (not labeled) is defined in a middle portion of the top board 31, so that four limiting boards 37 are formed by folding portions of the top board 31 toward the bottom board 31 along edges of the hole. Referring to FIG. 2 again, each limiting board 37 includes a limiting portion 371 and a resisting portion 372. Each limiting portion 371 is foldable and perpendicularly connected to the top board 31. Each resisting portion 372 is foldable and perpendicularly connected to the corresponding limiting portion 371. Each resisting portion 372 is attached to and resists against the bottom board 32 so that the four limiting portions 371 and the bottom board 32 cooperatively a receiving chamber 35 to accommodate the electronic device 200. A portion of the bottom board 32 corresponding to the receiving chamber 35 serves as a bottom surface of the receiving chamber 35. A cut 311 is defined in the top board 311 communicating with the receiving chamber 35. The cut 311 is configured for a user to conveniently remove the electronic device 200 from the receiving slot 35.

Two standing legs 34 are formed by the bottom board 32. In this embodiment, each standing leg 34 is substantially L-shaped and includes a connecting edge 341, a standing edge 342, and a movable edge 343. Each standing leg 34 is formed by cutting the bottom board 32 along the standing edge 342 and the movable edge 343 so that the standing edge 342 and the movable edge 343 are separated from the bottom board 32 and the connecting edge 341 is connected to the bottom board 32. The standing legs 34 can be folded along the connecting edge 341 to expose from the bottom board 32 and cooperatively support the support 30 in position on a plane P (e.g. a surface of a desk) with an edge of the bottom board 32. In other embodiment, the standing legs 36 may be other shapes such as H-shaped or A-shaped so long as the standing legs 36 can support the support 30.

FIGS. 2 and 5 show that, to package the electronic device 200 in the package box 100, the electronic device 200 is received in the receiving chamber 35. The support 30 is received in the second case 20 with the electronic device 200 and supported by the protrusion 24. Space between the support 30 and the bottom wall 21 can be used to receive accessories of the electronic device 200. The first case 10 is covered outside the second case 20 to package the second case 20.

To use the electronic device 200 to, e.g., watch videos, the support 30 is removed from the second case 20. The standing legs 34 are folded along the connecting edge 341 exposed from the bottom board 32. The standing legs 34 cooperatively support the support 30 in position on the plane P with an edge of the bottom board 32 so that the electronic device 200 can provide the better view angle.

The support 30 can be reused by the user which is eco-friendly. In addition, the support 30 which is formed by cutting the bottom board 32, has a relative simple structure and also is convenient to use.

In other embodiments, the first case 10 can be rotatably connected to the second case 20 via a hinge and opened and closed relative to the second case 20 by the hinge.

Furthermore, the first case 10 and the second case 20 can be integrated as a semi-enclosed and hollow box. The box defining an opening from which the support 30 can be received in or taken out from the box.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A packaging box, comprising:
   a box; and
   a support received in the box, the support comprising:
   a top board;
   a bottom board opposite to the top board; and
   three side boards interconnecting the top board and the bottom board; wherein the top board defines a hole and forms four limiting boards connecting to the top board and resisting against the bottom board; the limiting boards and the bottom board cooperatively form a receiving chamber; the receiving chamber comprises a standing leg formed from the bottom board, the standing leg is capable of folding relative to the bottom board and cooperatively supporting the support to position on a plane with the bottom board.

2. The packaging box of claim 1, wherein the standing leg comprises a connecting edge, a standing edge, and a movable edge; the connecting edge is connected to the bottom board, the standing edge and the movable edge are separated from the bottom board, the standing leg is capable of folding along the connecting edge to be exposed from the bottom board.

3. The packaging box of claim 1, wherein the standing leg is substantially L-shaped.

4. The packaging box of claim 1, wherein the top board defines a cut communicating with the receiving chamber.

5. The packaging box of claim 1, wherein the box comprises a first case and a second case; the first case comprises a top wall and a first side wall protruding from a peripheral edge of the top wall; the second case comprises a bottom wall, a second side wall protruding from a peripheral edge of the bottom wall, and a protrusion protruding from an inner surface of the second side wall, the support is received in the second case and supported by the protrusion, the first case is covered outside the second case.

6. A support, comprising:
   a top board;
   a bottom board opposite to the top board; and
   three side boards interconnecting the top board and the bottom board; wherein the top board defines a hole and forms four limiting boards connecting to the top board and resisting against the bottom board; the limiting boards and the bottom board cooperatively form a receiving chamber; the receiving chamber comprises a standing leg formed from the bottom board, the standing leg is capable of folding relative to the bottom board and cooperatively supporting the support to position on a plane with the bottom board.

7. The support of claim 6, wherein the standing leg comprises a connecting edge, a standing edge, and a movable edge; the connecting edge is connected to the bottom board, the standing edge and the movable edge are separated from the bottom board, the standing legs is capable of folding along the connecting edge to be exposed from the bottom board.

8. The support of claim 6, wherein the standing leg is substantially L-shaped.

9. The support of claim 6, wherein the top board defines a cut communicating with the receiving chamber.

* * * * *